United States Patent Office 3,367,934
Patented Feb. 6, 1968

3,367,934
DERIVATIVES OF ISOCYANURIC ACID
Francis Edward Gervase Tate and James Harry Wild, Manchester, England, assignors to Imperial Chemical Industries Limited, London, England, a corporation of Great Britain
No Drawing. Continuation-in-part of application Ser. No. 793,980, Feb. 18, 1959. This application July 27, 1961, Ser. No. 127,129
Claims priority, application Great Britain, Feb. 24, 1958, 5,873/58
5 Claims. (Cl. 260—248)

This invention relates to isocyanate polymers which are derivatives of isocyanuric acid and the present application is a continuaion-in-part of Ser. No. 793,980, now abandoned.

The preparation from organic isocyanates of polymers containing the ring structure

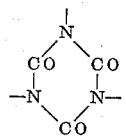

which is characteristic of isocyanuric acid and of isocyanurates derived therefrom is well known, the starting materials being either aliphatic isocyanates on the one hand or aromatic isocyanates on the other.

It has now been found that valuable new isocyanate polymers containing at least once in a molecule the ring structure characteristic of isocyanuric acid can be obtained by interacting in presence of a basic catalyst 2 molecular proportions of an aromatic polyisocyanate in which the —NCO groups are substituents in an aromatic ring or 2 molecular proportions of a mixture of such aromatic polyisocyanates with one equivalent proportion of an organic mono- or poly-isocyanate in which the —NCO groups are not directly attached to an aromatic ring or with one equivalent proportion of a mixture of such isocyanates.

Thus according to the present invention we provide new isocyanate polymers having the structures (I) and (II)

(I)
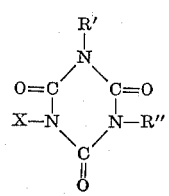

(II)
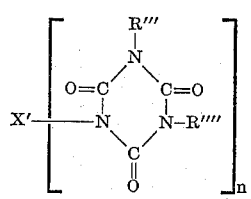

wherein R', R", R''' and R'''' are aromatic substituents the same or different which carry free —NCO groups and which are linked to an isocyanurate ring through a carbon atom which is part of an aromatic ring, and X is an alkyl, cycloalkyl, or aralkyl radical or group which may be interrupted by hetero atoms, or is a polyvalent organic radical linked to more than one isocyanurate ring through carbon atoms which are not part of an aromatic ring, and wherein $n$ is two or more than two and is equal to the valency of the polyvalent organic radical.

The new derivatives of isocyanuric acid may be made by interacting two molecular proportions of an aromatic polyisocyanate in which the —NCO groups are substituents in an aromatic ring or mixture of such isocyanates which one equivalent proportion of an organic mono or poly-isocyanate in which the —NCO groups are not directly attached to an aromatic ring or mixture of such isocyanates in presence of a basic catalyst, which is preferably a 3 and/or 4-substituted pyridine of such a basicity that, when substituted in benzoic acid in the meta or para position respectively, said 3- and/or 4-substituent increases the $pK_a$ value of the substituted benzoic acid, measured in water at 25° C., to greater than 4:35, or is a phosphine derivative as described in U.S. patent specification No. 2,671,082 or any trialkyl phosphine.

Aromatic isocyanates in which the —NCO groups are substituents in an aromatic ring suitable for use in preparing the products of the invention may be for example aryl diisocyantes such as 2:4-toluene diisocyanate,
2:4-chlorophenylene diisocyanate,
2:4-alkoxyphenylene diisocyanates,
2:4'-diphenylmethane diisocyanate,
chlorophenylene-2:6-diisocyanate,
chlorophenylene-2:5-diisocyanate,
m- and p-phenylene diisocyanate,
methoxy-2:4-diisocyanate,
methoxy-2:6-diisocyanate,
4:4'-diphenyl diisocyanate,
3:3'-dimethyl-4:4'-diisocyanato-diphenyl,
3:3'-dimethoxy-4:4'-diisocyanato-diphenyl,
3-methyl-4:4'-diisocyanato-diphenylmethane,
3:3'-dimethyl-4:4'-diisocyanato-diphenylmethane,
3:3'-dimethoxy-4:4'-diisocyanato-diphenyl-methane,
3:3'-dichloro-4:4'-diisocyanato-diphenyl-methane,
2:2'-dimethyl-4:4'-diisocyanato-diphenylmethane,
4:4'-diisocyanato-diphenylmethane,
4:4'-diisocyanato-diphenylethane,
2:5- and 2:6-tolylene diisocyanates,
naphthalene-1:5-diisocyanate,
naphthalene-1:4-diisocyanate,
aryl triisocyanates such as 2:4:4'-triisocyanato-diphenyl,
2:4:4'-triisocyanato-diphenylether,
2:4:6-triisocyanato-toluene,
4:4'-4''-triisocyanato-triphenylmethane, and aromatic poly-isocyanates which have undergone partial reaction giving isocyanates of higher molecular weight or functionality, for example by condensation with alcohols containing more than one hydroxyl group or by homopolymerisation to triaryl isocyanurates. Mixtures of aromatic poly-isocyanates may also be used. The presence in an aryl diisocyanate of a substituent ortho to one of the isocyanato groups impairs the ability of that isocyanato group to enter into polymerisation reactions with other isocyanato groups, and in the process of preparing the products of the present invention, when such ortho substituted aryl diisocyanates are employed, a high proportion of these less reactive groups remains unchanged at the end of the reaction time although substantially all other isocyanato groups may have undergone polymerisation.

Isocyanates in which the —NCO groups are not directly attached to an aromatic ring suitable for use in preparing the products of the invention may be for example ethyl,
n-propyl or n-butyl isocyanates,
alpha-omega-alkylene diisocyanates,
1:3 and 1:4-xylylene diisocyanates,
methylene-diisocyanate,
ethylene diisocyanate, decamethylene diisocyanate,
2:2'-diisocyanato-diethylether,
2:2'-diisocyanato diethylsulphide,
1-methyl-2:4-diisocyanato-cyclohexane,
1-methyl-2:6-diisocyanato-cyclohexane,
4:4'-diisocyanato dicyclohexylmethane, and
1:5-diisocyanato decalin n-butyl-1:2:2-triisocyanate, or
1:3:5-cyclohexyl triisocyanate.

When mono isocyanates in which the —NCO groups are not directly attached to an aromatic ring are employed isocyanuric acid derivatives of structure (I) are obtained.

When diisocyanates in which the —NCO groups are not directly attached to an aromatic ring are employed isocyanuric acid derivatives of structure (II) are obtained, where $n=2$.

Instead of using mixtures of monomeric isocyanates in preparing the products of the invention a mixture of 1 equivalent proportion of an isocyanate in which the —NCO groups are not directly attached to an aromatic ring or mixture of such isocyanates may be used with 1 molecular proportion of a uretedione having the formula

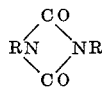

R representing aryl or substituted aryl groups, such uretedione being obtained from an aryl or substituted aryl poly-isocyanate or mixture of aryl or substituted aryl poly-isocyanates.

The products of the invention may be prepared in presence or absence of solvents for the isocyanates used as starting materials, and the reaction by which the products are obtained may be carried out at any temperature between 0° and 140° C. It is, however, preferred to carry out the reaction in a solvent medium, suitable solvents being for example ethyl acetate, chlorobenzene, dioxan and aromatic and aliphatic hydrocarbons.

The activity of the preferred catalysts is such that there is little difficulty in controlling any initial exothermic reaction by cooling. The reaction may be stopped, if desired by the addition of Friedel-Crafts catalysts or acid chlorides such as acetyl chloride or benzoyl chloride. The amount of catalyst may be varied to control the rate of the reaction, but in general it will be between 0.005% and 15% of the weight of aromatic isocyanate used.

The new derivatives of isocyanuric acid may be used in place of, or in addition to isocyanates, for a wide variety of purposes, for example as adhesives, curing agents for resins, and for the manufacture of polyurethane solid or cellular articles.

The invention is illustrated but not limited by the following examples in which parts and percentages are by weight.

Example 1

5 parts of 4-dimethylaminopyridine were added to a mixture of 194 parts of toluylene-2:4-diisocyanate and 220 parts of anhydrous ethyl acetate, at room temperature. After 10 minutes a copious precipitate occurred, and 61 parts of n-butyl isocyanate were added. After 28 hours mechanical shaking, a further 10 parts of n-butyl isocyanate were added and two hours later, 1 part of 4-dimethylamino-pyridine. The mechanical shaking was continued for a total of 70 hours, when a viscous solution was obtained. 5.5 parts of acetyl chloride were added, the solvent removed under high vacuum and the sticky solid washed with dry ether to give 210 parts of a yellow powder, which melted over the range 140-160° C. The isocyanate equivalent was calculated by reacting the product with piperidine and back titration of the base. NCO equivalent found 282; calculated for 1-n-butyl-2:5-di(3-isocyanato-4-methylphenyl)-isocyanurate, 224. Infra-red absorption spectrum of the product showed strong bands at 4.35 microns, due to the isocyanate groups, at 5.85 and 6.9 to 7 microns, due to the isocyanurate ring, and at 3.35 microns, due to the aliphatic chain.

Example 2

1 part of triethylphosphine was added to a mixture of 53.3 parts of toluylene - 2:4-diisocyanate, 12.7 parts of hexamethylene diisocyanate and 307 parts of anhydrous ethyl acetate. After 5 minutes shaking at room temperature, a copious precipitate occurred. The shaking was continued for 16 hours when a yellow translucent gel was obtained. 7.4 parts of benzyl chloride were added and the product precipitated with dry n-butyl ether, and the mixture agitated for 30 minutes. The ether was removed by decantation and the sticky product further washed with n-butyl ether and filtered. The isocyanate equivalent was measured as in the previous example.

NCO equivalent found 381, 3:3':5:5'-tetra-(-3-isocyanato - 4 - methylphenyl) - 1: 1' - hexamethylene-diisocyanurate required 216. The infra-red absorption spectrum of the polymeric product, which did not melt below 350° C., showed strong bands at 4.35 microns, indicating free isocyanate groups, at 5.85 and 6.9 to 7.05 microns for the isocyanurate rings and at 3.35 microns for the aliphatic link.

Example 3

1 part of 4-ethoxypyridine was added to a mixture of 10 parts of hexadecyl isocyanate, 11 parts of toluylene-2:4-diisocyanate and 16.6 parts of anhydrous ethyl acetate. The mixture was mechanically shaken at room temperature for 2 days, when a sticky solid was obtained. The mixture was shaken with dry petroleum ether (B.P. 40–60° C.) and filtered to give 15.6 parts of a yellow solid which did not melt below 350° C. The infra-red absorption spectrum of the product showed strong bands at 4.35 microns due to free isocyanate groups, at 5.84 and 6.85 microns due to the isocyanurate ring, and 3.37 microns due to an aliphatic chain.

Example 4

0.044 part of tri-n-butylphosphine were added to a mixture of 1.68 parts of hexamethylene diisocyanate, 6.96 parts of toluylene-2:6-diisocyanate and 8.64 parts of dry ethyl acetate. After 24 hours a clear viscous liquid was obtained. 0.05 part of acetyl chloride were added with stirring and the mixture was poured into 70 parts of dry petroleum ether (boiling range 40–60° C.), when a white solid product was obtained. The product was filtered, washed with a further 35 parts of the above petroleum ether giving a yield of 8.5 parts when dry.

The infra-red absorption spectrum of the product showed bands at 4.4 microns typical of free isocyanate groups, at 3.35 microns typical of the hexamethylene chain and at 5.85 and 7.05 microns typical of the isocyanurate ring. The product was therefore derived from the 3:3':5:5' - tetra(2 - methyl - 3 - isocyanatobenzene)-1:1'-hexamethylene-diisocyanurate configuration. It became opaque at 141° C. and melted at 214° C.

What we claim is:
1. An isocyanurate derivative selected from the group consisting of (a) compounds having the formula

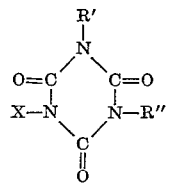

in which R' and R" are carbocyclic aromatic groups carrying free isocyanate groups and are attached to the nitrogen at a carbon atom which is a part of the aromatic nucleus of said aryl group and X is selected from the group consisting of lower alkyl, cyclohexyl and lower carbocyclic aralkyl groups attached to the nitrogen through a carbon atom which is not a member of an aromatic nucleus, and (b) compounds having the formula

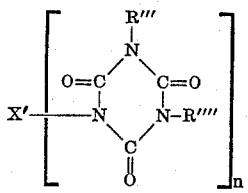

in which R''' and R'''' are carbocyclic aromatic groups carrying free isocyanate groups and are attached to the nitrogen atom at a carbon atom which is a part of the aromatic nucleus of said aryl group and X' is the polyvalent organic residue of a member of the group consisting of lower alkanes, cyclohexane and lower alkyl carbocyclic aromatic compounds attached to the nitrogen atoms through carbon atoms which are not members of aromatic nuclei and in which $n$ is an integer not less than 2.

2. A process for the manufacture of isocyanuric acid derivatives selected from the group consisting of (a) compounds having the formula

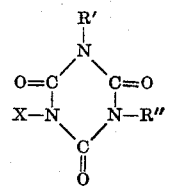

in which R' and R'' are carbocyclic aromatic groups carrying free isocyanate groups and are attached to the nitrogen at a carbon atom which is a part of the aromatic nucleus of said aryl group and X is selected from the group consisting of lower alkyl, cyclohexyl and lower carbocyclic aralkyl groups attached to the nitrogen through a carbon atom which is not a member of an aromatic nucleus, and (b) compounds having the formula

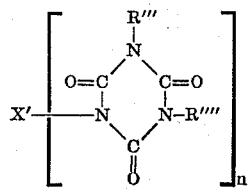

in which R''' and R'''' are carbocyclic aromatic groups carrying free isocyanate groups and are attached to the nitrogen atom at a carbon atom which is a part of the aromatic nucleus of said aryl group and X' is the polyvalent organic residue of a member of the group consisting of lower alkanes, cyclohexane and lower carbocyclic alkyl aromatic compounds attached to the nitrogen atoms through carbon atoms which are not members of aromatic nuclei and in which $n$ is an integer not less than 2 which comprises reacting two molecular proportions of at least one carbocyclic aromatic polyisocyanate in which the isocyanate groups are attached to nuclear carbon atoms of the aromatic ring with one molecular equivalent of an organic isocyanate selected from the group consisting of lower alkyl, cyclohexyl and lower carbocyclic aralkyl isocyanates in which the isocyanate groups are attached to a carbon atom which is not a member of an aromatic nucleus in the presence of a basic catalyst selected from the group consisting of 3- and 4-substituted pyridines in which the substituents are selected from the group consisting of 4-alkoxy, 4-aralkoxy, 3- and 4-alkylarylamino, 3- and 4-dialkylamino, 3- and 4-N-morpholino, 3- and 4-N-piperidino, and 3- and 4-N-pyrolidino, said pyridine being of such basicity that, when substituted in benzoic acid in the 3- and 4-positions respectively, said 3- and 4-substituent increases the Ka value of the substituted benzoic acid, measured in water at 25° C. to greater than 4.35, and tri-lower alkyl phosphines.

3. 1 - n - butyl - 3:5-di-(3-isocyanato-4-methylphenyl)-isocyanurate.

4. 3:3':5:5' - tetra - (3 - isocyanato - 4-methylphenyl)-1:1'-hexamethylene-diisocyanurate.

5. 3:3':5:5' - tetra - (2 - methyl - 3-isocyanatophenyl)-1:1'-hexamethylene diisocyanurate.

References Cited
UNITED STATES PATENTS
2,978,449  4/1961  France et al. _____ 260—248

JOHN D. RANDOLPH, *Primary Examiner.*

I. MARCUS, WALTER A. MODANCE, *Examiners.*

M. WESTERN, J. FORD, *Assistant Examiners.*